US 8,032,658 B2

(12) United States Patent
Tripathi

(10) Patent No.: US 8,032,658 B2
(45) Date of Patent: Oct. 4, 2011

(54) COMPUTER ARCHITECTURE AND PROCESS FOR IMPLEMENTING A VIRTUAL VERTICAL PERIMETER FRAMEWORK FOR AN OVERLOADED CPU HAVING MULTIPLE NETWORK INTERFACES

(75) Inventor: Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1656 days.

(21) Appl. No.: 10/885,999

(22) Filed: Jul. 6, 2004

(65) Prior Publication Data

US 2006/0047856 A1 Mar. 2, 2006

(51) Int. Cl.
*G06F 15/16* (2006.01)
(52) U.S. Cl. ......................... 709/250; 709/223; 709/224
(58) Field of Classification Search .................. 709/223, 709/250, 224, 229
See application file for complete search history.

(56) References Cited

U.S. PATENT DOCUMENTS

| 5,513,257 | A | * | 4/1996 | Yoo et al. ................. 379/221.03 |
| 5,548,533 | A | * | 8/1996 | Gao et al. ...................... 709/235 |
| 5,636,371 | A | * | 6/1997 | Yu .................................. 703/26 |
| 5,717,691 | A | * | 2/1998 | Dighe et al. .................... 370/401 |
| 6,182,252 | B1 | * | 1/2001 | Wong et al. ..................... 714/708 |
| 6,574,242 | B1 | * | 6/2003 | Keenan et al. ................. 370/474 |
| 6,577,871 | B1 | * | 6/2003 | Budka et al. ................... 455/453 |
| 7,802,001 | B1 | * | 9/2010 | Petry et al. ..................... 709/230 |
| 2005/0050221 | A1 | * | 3/2005 | Tasman et al. ................. 709/232 |

OTHER PUBLICATIONS

U.S. Appl. No. 10/698,211, filed Oct. 31, 2003.
U.S. Appl. No. 10/767,021, filed Jan. 28, 2004.

* cited by examiner

*Primary Examiner* — Lashonda Jacobs
(74) *Attorney, Agent, or Firm* — Osha • Liang LLP

(57) ABSTRACT

Techniques and modes of operation for using network interfaces in a single or multi-CPU environment are disclosed. The techniques provide a virtual "vertical perimeter" framework suitable for processing data through multiple network interfaces assigned to a single CPU. In this framework, techniques for installing and servicing a plurality of network interfaces with a single CPU utilizing virtual vertical perimeters and sub-queues is disclosed. A computer system including at least one CPU and more network interfaces than CPU's is disclosed. At least two of the interfaces are assigned to an associated CPU. The computer system includes an operating system with plurality of sub-queues and an associated sub-queue controller. The sub-queues are associated with at least two network interfaces assigned to the CPU. The sub-queue controller is configured for coordinating the generation and operation of the sub-queues thereby to facilitating message traffic through the at least two network interfaces.

25 Claims, 9 Drawing Sheets

COMPUTER ARCHITECTURE AND PROCESS FOR IMPLEMENTING A VIRTUAL VERTICAL PERIMETER FRAMEWORK FOR AN OVERLOADED CPU HAVING MULTIPLE NETWORK INTERFACES

CROSS-REFERENCE TO RELATED APPLICATIONS

This application is related to U.S. patent application Ser. No. 10/767,021, now abandoned, entitled "VERTICLE PERIMETER FRAMEWORK FOR PROVIDING APPLICATION SERVICES" by Sunay Tripathi and Eiji Ota, filed on Jan. 28, 2004, which is hereby incorporated by reference herein for all purposes.

U.S. patent application Ser. No. 10/683,933, entitled "A SYSTEM AND METHOD FOR VERTICAL PERIMETER PROTECTION", filed on Oct. 10, 2003 is also hereby incorporated herein by reference for all purposes.

U.S. patent application Ser. No. 10/683,720, issued as U.S. Pat. No. 7,290,055, entitled "MULTITHREADED ACCEPT MECHANISM IN A VERTICAL PERIMETER COMMUNICATION ENVIRONMENT" by Sunay Tripathi, filed Oct. 10, 2003 is also hereby incorporated herein by reference for all purposes.

U.S. patent application Ser. No. 10/683,897, issued as U.S. Pat. No. 7,480,291, entitled "A METHOD AND SYSTEM FOR PROCESSING COMMUNICATIONS PACKETS ACCORDING TO EVENT LISTS" by Sunay Tripathi and E. Nordmark, filed Oct. 10,2003 is also hereby incorporated herein by reference for all purposes.

U.S. patent application Ser. No. 10/683,959, issued as U.S. Pat. No. 7,363,383, entitled "RUNNING A COMMUNICATION PROTOCOL STATE MACHINE THROUGH A PACKET CLASSIFIER" by Sunay Tripathi and Bruce Curtis, filed Oct. 10, 2003 is also hereby incorporated herein by reference for all purposes.

U.S. patent application Ser. No. 10/683,934, issued as U.S. Pat. No. 7,313,139, entitled "A METHOD FOR BATCH PROCESSING RECEIVED MESSAGE PACKETS" by Sunay Tripathi and S. Karnatala, filed Oct. 10, 2003 is also hereby incorporated herein by reference for all purposes.

U.S. patent application Ser. No. 10/683,762, issued as U.S. Pat. No. 7,330,484, entitled "A METHOD FOR TRANSMITTING PACKET CHAINS" by Sunay Tripathi, Bruce Curtis and C. Masputra, filed Oct. 10, 2003 is also hereby incorporated herein by reference for all purposes.

BACKGROUND OF THE INVENTION

Computer systems typically utilize a layered approach for implementing functionalities relating to communications frameworks where a protocol layer is a program module for processing different portions of data traveling from a network to an application or when the application decides to send data out to remote peer over the network. The layered approach requires examination of data by each protocol layer to determine if any work needs to be performed by that layer before sending the data to the next protocol layer.

In some conventional implementations "horizontal perimeters" are provided to provide per module or per protocol stack layer processing. This leads to the same packets being processed on more than one Central Processing Unit (CPU) in a multi-CPU environment. In addition, conventional techniques typically provide only a single application in multi-CPU environments. This means that applications and packets can be processed by different CPU's at various times. In addition, data related to the applications (application data) is shared between the CPU's.

In any case, conventionally, in a multi-CPU environment (e.g., multi-processor server) data (message packets) can be stored and processed by different CPU's at various layers in the process. Typically, for better efficiency, the application data is stored in caches associated with the CPU that is currently processing the message packets. But if the processing CPU changes at any time, a cache miss can occur. This means that, among other things, message packets may need be transferred from the cache of one CPU to the cache of another CPU. This means that any one of the CPU's can be interrupted when data (e.g., a packet) is received into the shared operating system via a network interface. The CPU that is interrupted needs to access data. However, data may be in cached in another CPU (i.e., not the interrupted CPU). This results in the need for cache miss handling. Moreover, if the cache was modified in between, this operation becomes very expensive. This problem is exacerbated in environments where there is a significant data load on the system (i.e., the system is very busy).

One approach to combating this problem was to introduce vertical perimeter architectures. Such vertical perimeters vertically integrate message processing in a manner that specifically binds a designated network interface card to a specific CPU for all message traffic through the designated network interface card. This is accomplished using an S-queue (serialization queue) that enables the vertical processing of a message by the same CPU at all steps required to process a message of the designated network interface card. Moreover, such architectures are capable of controlling the interrupt mode used to pass messages between the network interface card and the kernel of the operating system. Thus, when the S-queue becomes too full or when the rate at which data is been received by the NIC becomes higher than some threshold the interrupt mode is of the network interface is halted until the is more room in the associated S-queue. The nature of some vertical perimeter architectures is explained in greater detail in, for example, U.S. patent application Ser. No. 10/767,021, entitled "VERTICLE PERIMETER FRAMEWORK FOR PROVIDING APPLICATION SERVICES", filed on Jan. 28, 2004, which has been incorporated by reference.

Such conventional vertical perimeter frameworks are suitable for many purposes, but when the number of network interfaces exceeds the number of CPU's certain system inefficiencies slow reduce the capacity of the overall systems. For example, if the data from two NIC's are being input into the same S-queue the system cannot readily distinguish which NIC provided the data. Any efforts to distinguish which NIC provided a given piece of data would require a further investment of kernel processing time thereby further slowing down the operation of the system. Thus, if one NIC (e.g., NIC A) is pouring in a large amount of data and another NIC (e.g., NIC B) is pouring in a relatively small amount of data the slower NIC (NIC B) suffers. This is due to the serial nature of the S-queue. Data comes out in the order it was placed in the S-queue. This results in significant kernel time being devoted to the processing of messages for NIC A and less time for NIC B. Thus, a connection using NIC B can have a very long delay before a connection can be completed due to large number of messages for NIC A that must be processed first. Moreover, NIC B is doubly penalized because every time a new piece of data comes in for NIC A the kernel is interrupted further slowing processing. Also, if an extraordinarily large amount of data arrives from NIC A, the S-queue can be completely filled require NIC B data to remain on the NIC until such time as there is room in the S-queue. Also, because two (or more) NIC are now feed data to the S-queue the system loses its ability to regulate the data flow from the NIC. Therefore, improvements can be made.

SUMMARY

In view of the foregoing, techniques for providing sub-queue services in multi-CPU environments are desirable. Accordingly, techniques for servicing a plurality of network interfaces with a single CPU utilizing virtual vertical perimeters and sub-queues is disclosed.

A method embodiment of the invention describes a method of servicing message packets in a computer network architecture. A computer system architecture having at least one central processing unit (CPU) and a plurality of network interfaces is provided. The system is configured to include a number of network interfaces that is greater than the number of CPU's. The system also includes at least one overloaded CPU having more than one network interface assigned to it. Additionally, the overloaded CPU has associated therewith a sub-queue controller and an associated sub-queues for each network interface assigned to it. The method further involves determining which of the sub-queue shall be selected for message processing and retrieving a message packet from the selected sub-queue. The CPU then processes the message packet.

In another method embodiment a method of installing a network interface in a computer network architecture is disclosed. The method involves providing a computer system architecture having at least one central processing unit (CPU) and a plurality of existing network interfaces wherein the number of network interfaces is at least as great as the number of CPU's. A new network interface is introduced to the computer system architecture. The method determines which CPU that the new network interface shall be assigned and generates associated sub-queues sufficient to accommodate network interfaces. The sub-queues are then assigned to the CPU and a controller is generated to coordinate the operation of the sub-queues of the CPU.

In another embodiment, a computer system is disclosed. The system includes at least one CPU and a plurality of network interfaces wherein the number of network interfaces is greater than the number of CPU's. The interfaces are assigned so that at least two of the interfaces are assigned to one of the CPUs. The computer system includes an operating system with plurality of sub-queues and an associated sub-queue controller. Each sub-queue is associated with one of the network interfaces that are assigned to the CPU and the sub-queue controller is configured for coordinating the generation and operation of the sub-queues thereby to facilitating message traffic through the at least two network interfaces.

In addition, in at least one embodiment, a sub-queue controller module for implementation in an operating system of a computer system is disclosed. The controller being configured for coordinating the generation and operation of sub-queues used to facilitate message traffic between a CPU and an associated set of network interfaces. The controller includes data for identifying its associated sub-queues operating in the operating system. Each identified sub-queue is associated with one of the network interfaces associated with the CPU. Also, the controller includes indicators that identify memory locations for each sub-queue assigned to the network interfaces of the CPU. The controller includes an allocation engine for regulating the operation of said sub-queues to facilitate message traffic between the set of network interfaces and the first CPU. Such regulation can include the regulation of message traffic between the CPU and its sub-queues, for example using a scheduler or other means. Also, such regulation can include the regulation of message traffic between the network interfaces and their sub-queues, for example to control of data to and from the sub-queues.

These and other aspects of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention as set forth in the claims.

It is to be understood that in the drawings like reference numerals designate like structural elements. Also, it is specifically pointed out that the depictions in the drawings are not necessarily to scale.

DETAILED DESCRIPTION

The present invention has been particularly shown and described with respect to embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

As expressed generally, the principles of the present invention enable a single or multiple CPU system to efficiently operate a plurality of network interfaces (e.g., network interface cards (NIC's)). In particular, the principles of the invention specifically enable efficient operation in a computer system having more network interfaces than CPU's. Broadly, this is accomplished by establishing a virtual vertical perimeter for each network interface such that more than one network interface can be assigned to a CPU for processing. Thus, the same CPU processes all data received at an interface assigned to a CPU. Embodiments of the invention are now described in detail.

Figure 1A:
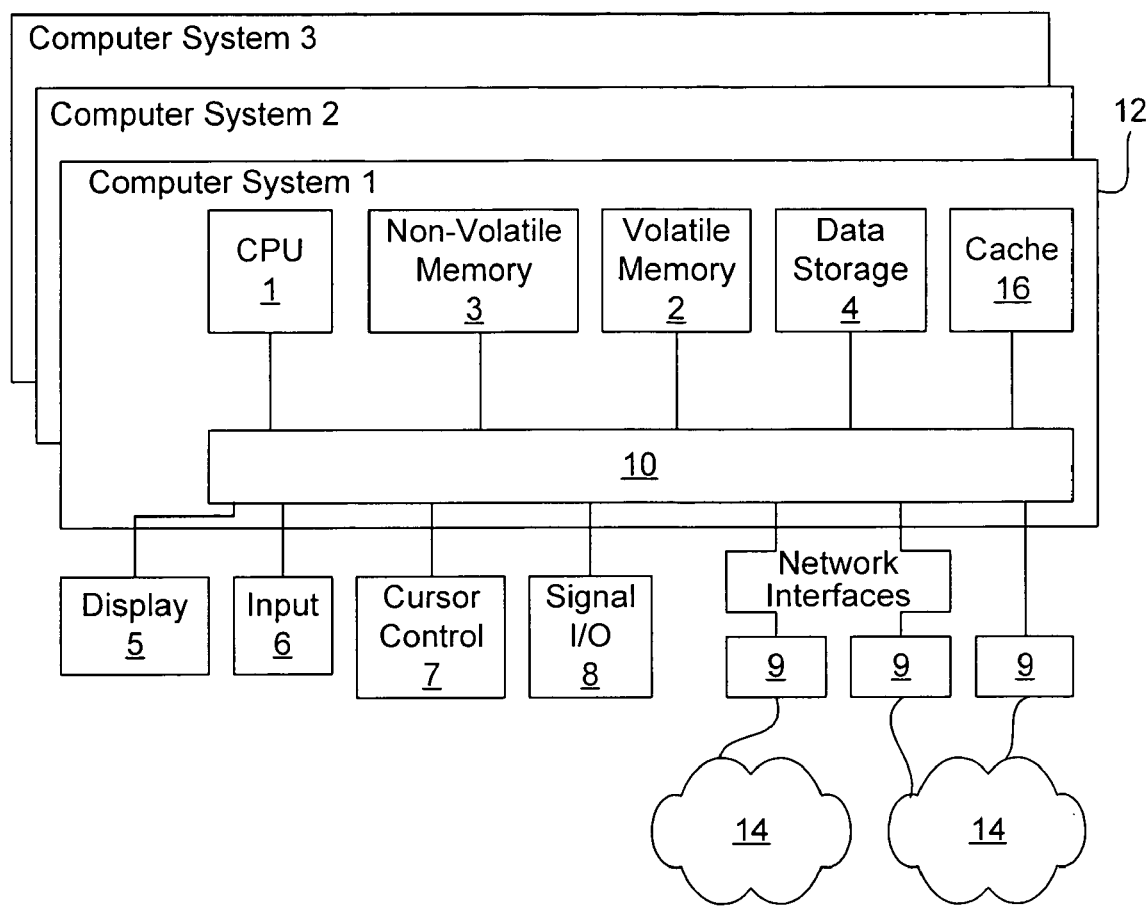
FIG. 1A is a logical block diagram of an exemplary computer system in accordance with an embodiment of the present invention.

FIG. 1A presents a simplified block diagram illustrating portions of an example computer system 12. It is appreciated that computer system 12 of FIG. 1A described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer, an embedded computer system or a system in which one or more of the components of the computer system is located locally or remotely and accessed via a network.

Computer system 12 may include multiple processors and includes: an address/data bus 10 for transmitting data; a central processor unit 1 coupled with bus 10 for processing information and instructions, a cache 16 coupled with bus 10 for temporarily storing data; a volatile memory unit 2 (e.g., random access memory, static RAM, dynamic RAM, etc.) coupled with bus 10 for storing information and instructions for central processor unit 1; a non-volatile memory unit 3 (e.g., read only memory, programmable ROM, flash memory, EPROM, EEPROM, etc.) coupled with bus 10 for storing static information and instructions for central processor unit 1; and a data storage device 4 (e.g., disk drive) for storing information and instructions.

Computer system 12 may also optionally be configured with: a display device 5 coupled with bus 10 for displaying information to the computer user; an alphanumeric input device 6 arranged to communicate information and command selections to central processor unit 1; a cursor control or directing device 7 coupled with bus 10 for communicating user input information and command selections to central processor unit 1; and a signal communication interface 8 (e.g. a serial port), coupled with bus 10. Additionally, a plurality of network interfaces 9 couple the computer system 12 to one or more networks 14. It is noted that the components associated with system 12 described above may be resident to and associated with one physical computing device. However, one or more of the components associated with system 12 may be physically distributed to other locations and be communicatively coupled together (e.g., via a network). Further aspects of suitable computer systems are described in greater detail.

Figure 1B:
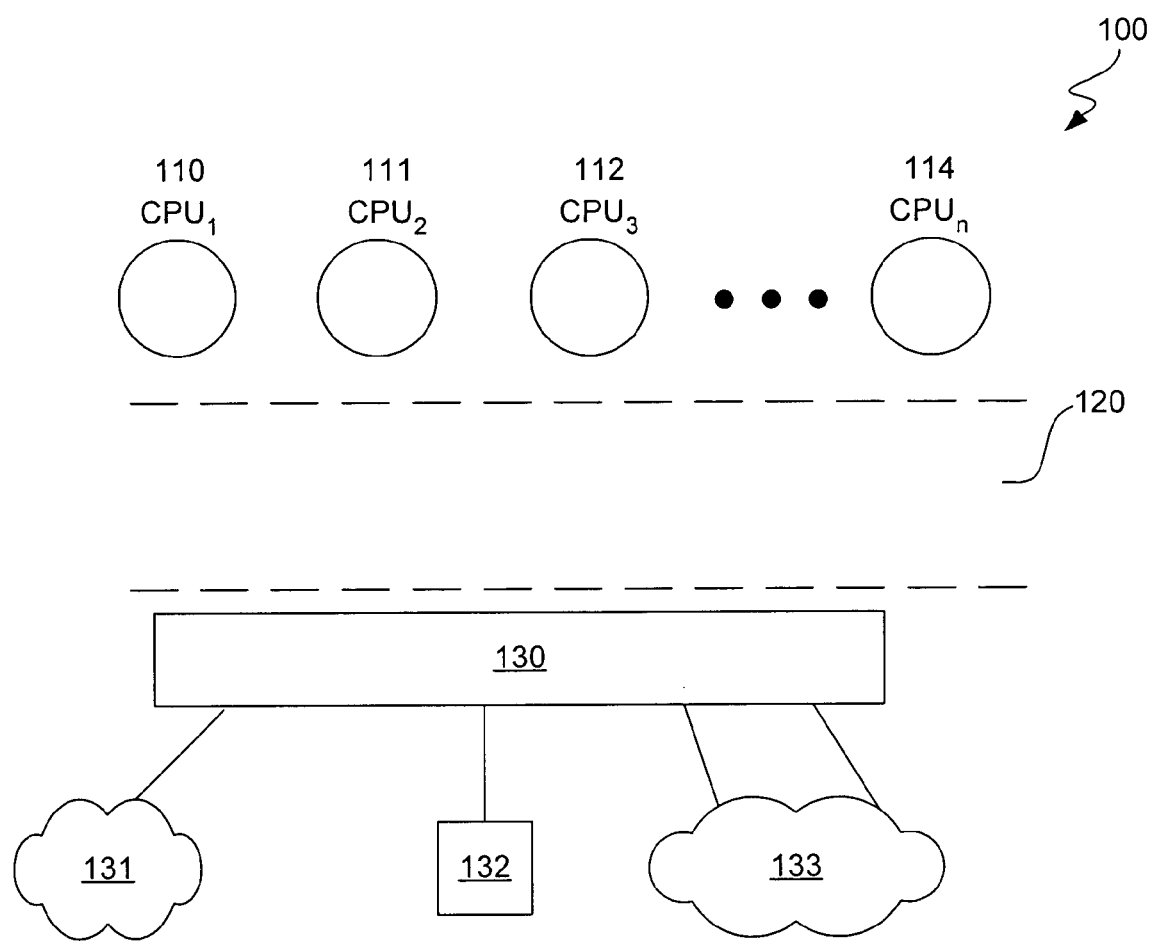
FIG. 1B is a simplified figurative depiction of computer network architecture in accordance with the embodiments of the invention.

FIG. 1B illustrates a computer system 100 in accordance with one embodiment of the invention. Computer system 100 includes CPU's 110, 111, 112, 114, (CPU$_1$, CPU$_2$, CPU$_3$, . . . CPU$_n$). The system 100 includes an operating system layer 120 which includes the kernel as well as operating system processes. Additionally, a network interface layer 130 is shown which schematically depicts the many network interfaces of the system in a simplified schematic representation. The network interface layer 130 is shown having connections to a first network 131, another computer system 132, and with a number of interfaces to a second network 133.

Figure 2:
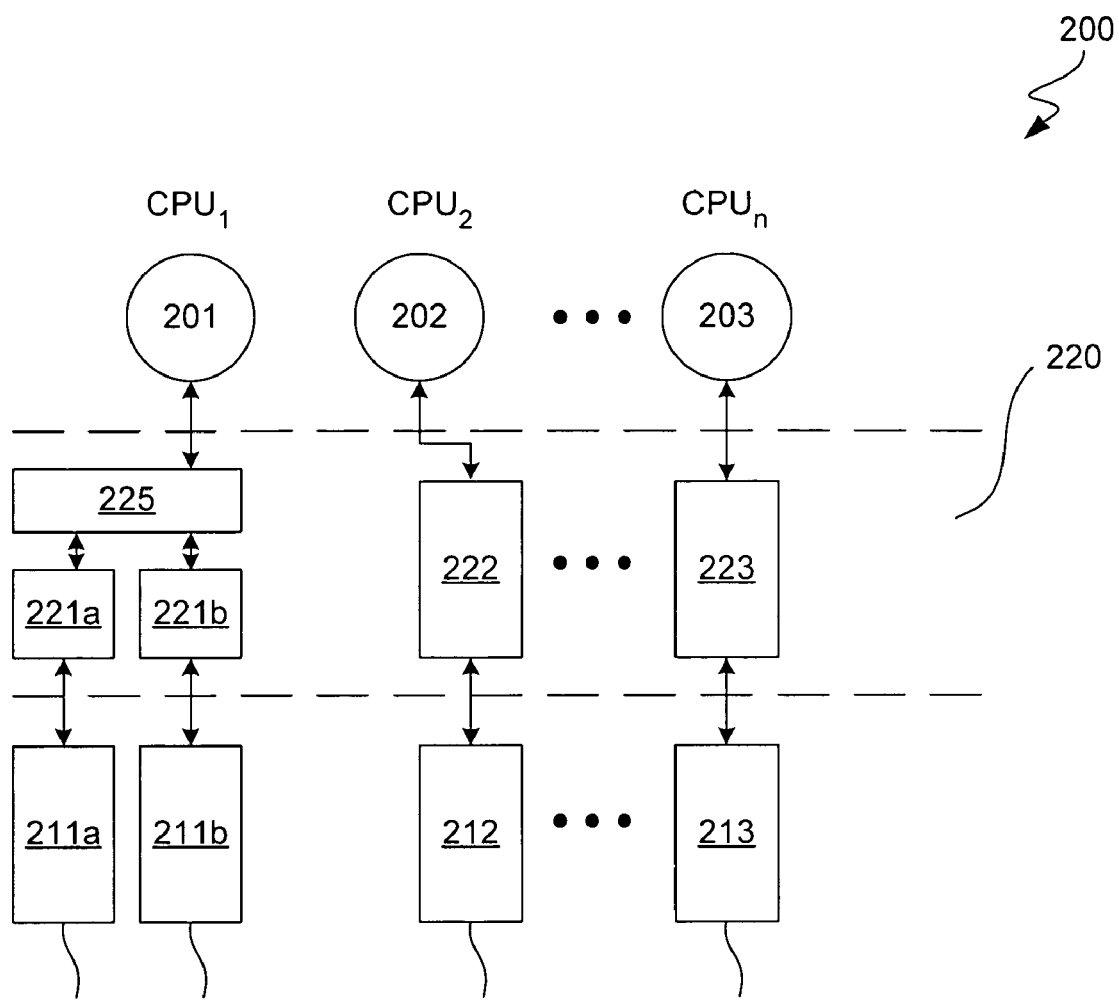
FIG. 2 is a simplified schematic depiction of a computer system architecture configured in accordance with another embodiment of the invention.

FIG. 2 depicts a more detailed view of a computer system architecture embodiment 200 configured to accommodate multiple network interfaces in accordance with the principles of the invention. The depicted system 200 includes a plurality of CPU's 201, 202, 203 of a multiple CPU system. The system includes a plurality of network interfaces 211a, 211b, 212, 213 connected with the system. The network interfaces 211a, 211b, 212, 213 can be network interface cards (NIC), for example, an Ethernet card, Token Ring card, or any network card (or adaptor) that can serve as a network interface. As can be seen, there are more interface cards than CPU's. The depicted embodiment uses a virtual queue structure to efficiently interconnect the system with the network interfaces. This structure functions in the operating system layer 220 to operate virtual vertical perimeters that bind network interfaces to specific CPU's for processing.

Again referring to FIG. 2 the operating system layer 220 includes queues 222, 223 associated with dedicated CPU's 202, 203. These queues are typically serialization queues (S-queues). Typically, these operate in accordance with FIFO (first in first out) principles. Also, associated with queues 222, 223 are network interfaces 212, 213. The network interfaces 212, 213 are assigned to specific CPU's such that all data passing through a specific network interface is processed by the same CPU. Additionally, all processing for a given message packet (e.g., IP processing, TCP processing, socket processing, and the like) is performed by the same CPU with further queuing once the processing for a given packet starts. This is known as a vertical perimeter because messages are processed vertically through the network protocol processing layer. Methods and processes for establishing such conventional vertical perimeters are known to those having ordinary skill in the art. When network interfaces are in communication with designated CPU's in this manner they are "assigned" or "bound" to the CPU designated for processing message packets for the interface. In such a conventional binding, the kernel removes message packets provided by the network interfaces to an associate queue and then from the queue to the CPU for processing. For example, CPU 202, queue 222, and network interface 212 define a vertical perimeter.

As alluded to previously, when embodiments of the invention have more network interfaces than CPU's the conventional vertical perimeter has certain limitations. Thus, when the system configuration includes more network interfaces than there are CPU's available, virtual vertical perimeters can be formed for the network interfaces to facilitate message traffic through the affected network interfaces. FIG. 2 depicts one such structure.

With continuing reference to FIG. 2, a virtual queue or sub-queue is formed for each network interface. In the depicted embodiment, a first network interface 211a and a second network interface 211b are assigned to a first CPU 201. In order to facilitate data traffic between the first CPU 201 and the first network interface 211a and a second network interface 211b sub-queues are implemented. A first sub-queue 221a and a second sub-queue 221b are configured in the operating system 220 to facilitate message traffic between the CPU 201 and the network interfaces 211a, 211b. These sub-queues can also be implemented as serialization queues (i.e., data is read out of the queue in the order it was placed in the queue). Again, a FIFO type buffer configuration can be used.

Additionally, a virtual sub-queue controller (or VSQ controller) 225 is used for coordinating the generating and operating of the sub-queues to facilitate message traffic through the at least two network interfaces. The controller 225 sets up new sub-queues as needed when new network interfaces are plugged into the system. Additionally, the controller can allocate when data (e.g., message packets) is to be processed by the CPU. In particular, the controller can allocate when data is received at the CPU from the sub-queues. Importantly, the controller can designate which specific sub-queues the CPU can receive data from. Additionally, the controller can also control the rate at which data is received at the sub-queues from the network interfaces. This configuration can result in increases of CPU efficiency on the order of 30-50%. These features will be described in greater detail below with respect to the following figures.

Figure 3:
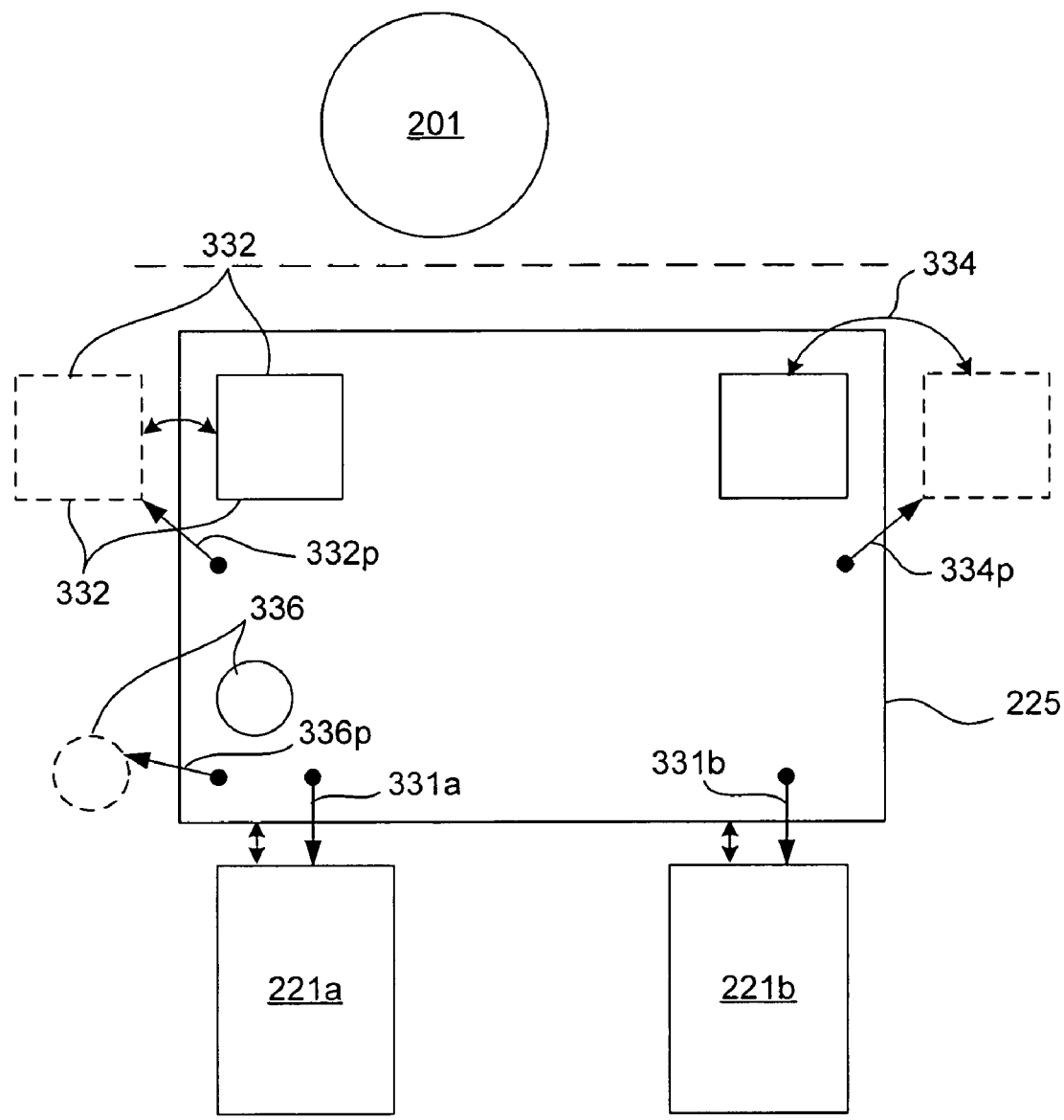
FIG. 3 is a more detailed schematic depiction of the computer system architecture of FIG. 2 configured in accordance with an embodiment of the invention.

FIG. 3 provides a more detailed view of one embodiment of a sub-queue controller 225 in accordance with the principles of the invention. This controller 225 is associated with the CPU 201. Because the CPU 201 has more than one network interface assigned to it, it can be referred to as overloaded. Thus, in this depiction the overloaded CPU 201 has two network interfaces 211a, 211b assigned to it. The controller also includes information concerning all of the sub-queues associated with the controller 225. For example, the controller identifies the number of sub-queues (two in this example). Also, the controller 225 includes indicators (331a, 331b) for each sub-queue. Each indicator identifies a memory location for each sub-queue associated with it. Thus, each indicator identifies a memory location for each sub-queue assigned to each of the network interfaces associated the overloaded CPU. Here indicator 331a identifies sub-queue 221a and indicator 331b identifies sub-queue 221b.

Additionally, FIG. 3 depicts a sub-queue set-up engine 332 which is configured to set up sub-queues when a new network interface is installed on the system. The sub-queue set-up engine 332 can operate as part of the controller itself or optionally it can be configured as part of the operating system. This engine 332 is capable of recognizing when new network interfaces are added to the system and setting-up new sub-queues to service the new network interfaces. In addition, the sub-queue set-up engine 332 can be configured to enable dynamic installation of the new network interface and dynamically set-up the new sub-queues associated with the new interface while the computer system remains in operation. Thus, all a user need do is plug a new interface into the system and the engine 332 recognizes that a new interface has been added and automatically sets-up the sub-queues and if needed sets up the controller 225 itself. It is intended that this set-up process can be performed without need to turn the computer off. Additionally, the controller can include an indicator 332p that identifies a memory location for the sub-queue set up engine 332. Thus, the indicator 332p allows the controller 225 to readily access and use the memory location for the sub-queue set-up engine 332.

Additionally, the controller can include an allocation engine 334 configured to allocate which sub-queues may have their contents processed at any given time. Alternatively, the allocation engine can be configured as part of the operating system rather than the controller itself. Typically, the allocation engine incorporates a scheduling algorithm or implements scheduling hardware or software to determine which sub-queues data should be accessed for processing by the CPU 201. For example, the processing time allocated to each sub-queue can be allocated using a time based priority system (e.g., the data of sub-queue 1 is processed for five seconds, then the data of sub-queue 2 is processed for five seconds and so on). Also, the processing time can be allocated on a packet based priority system (e.g., 5 message packets of sub-queue 1 are processed then 5 message packets of sub-queue 2 are processed and so on). The packet and time weightings can be set and adjusted dynamically by a user at will. Additionally, many other types of priority systems can be implemented. The methods and techniques of such priority and scheduling system will discussed in more detail below. Additionally, the controller can include an allocation indicator 334p that identifies a memory location for the allocation engine 334. Thus, the indicator 334p allows the controller 225 to readily access and use the memory location for the allocation engine 334. Additionally, the allocation engine can include a plurality of schedulers that operate in different modes. All that the controller need do is select the desired scheduler and implement it. The memory locations of these schedulers can also be designated using indicators.

Additionally, the controller can control the rate at which data is transferred from a network interface and its associated sub-queue. This can be useful when the network interface has transferred so much data that it threatens to overwhelm the sub-queue receiving the data. Under such circumstance it would be advantageous to reduce the data flow to the sub-queue from the network interface. Thus, the controller may also include a NIC data transfer engine 336 configured to determine how much data can be transferred from network interface to a sub-queue. Alternatively, the NIC data transfer engine 336 can be configured as part of the operating system rather than the controller itself. Typically, the NIC data transfer engine 336 evaluates the amount of data in each sub-queue to determine how full the sub-queue is (i.e., the engine 336 determines a data occupancy rate for each sub-queue). Generally, a threshold value can be determined or set by a user, for example, using factors such as amount of data in the sub-queue, amount of space remaining for data in the sub-queue, current data transfer rate from the network interface to the sub-queue, average or peak data transfer rates from the network interface, and so on. The engine 336 evaluates the sub-queues associated with the controller 225 and adjustments of the data transfer rate can be periodically and dynamically made. They can be made automatically or manually. For example, if a sub-queue has a threshold set at, for example, 95% capacity, when the sub-queue becomes 95% full, the engine 336 can change the transfer mode. For example, say the sub-queue was operating in "interrupt" mode (i.e., every time data is received by the network interface (e.g., a NIC) it interrupts the operating system to transfer data to the associated sub-queue) and it reaches its designated threshold (e.g., in our simplified example, 95% full) then it stops receiving data. In one example this can be achieved by switching to a different mode of operation. For example, switching to a "polling" mode of operation (data is sent only upon request of the sub-queue). The sub-queue could continue in the polling mode until, for example, some other threshold (e.g., demarcating a low occupancy rate for the sub-queue) level is reached at which point the sub-queue could return to an interrupt mode of operation. The methods and techniques of such data transfer control are well known to those having ordinary skill in the art and will not be further detailed here. Additionally, the controller can include a NIC data transfer engine indicator 336p that identifies a memory location for the NIC data transfer engine 336. Thus, the indicator 336p allows the controller 225 to readily access and use the memory location for the NIC data transfer engine 336.

Figure 4A:
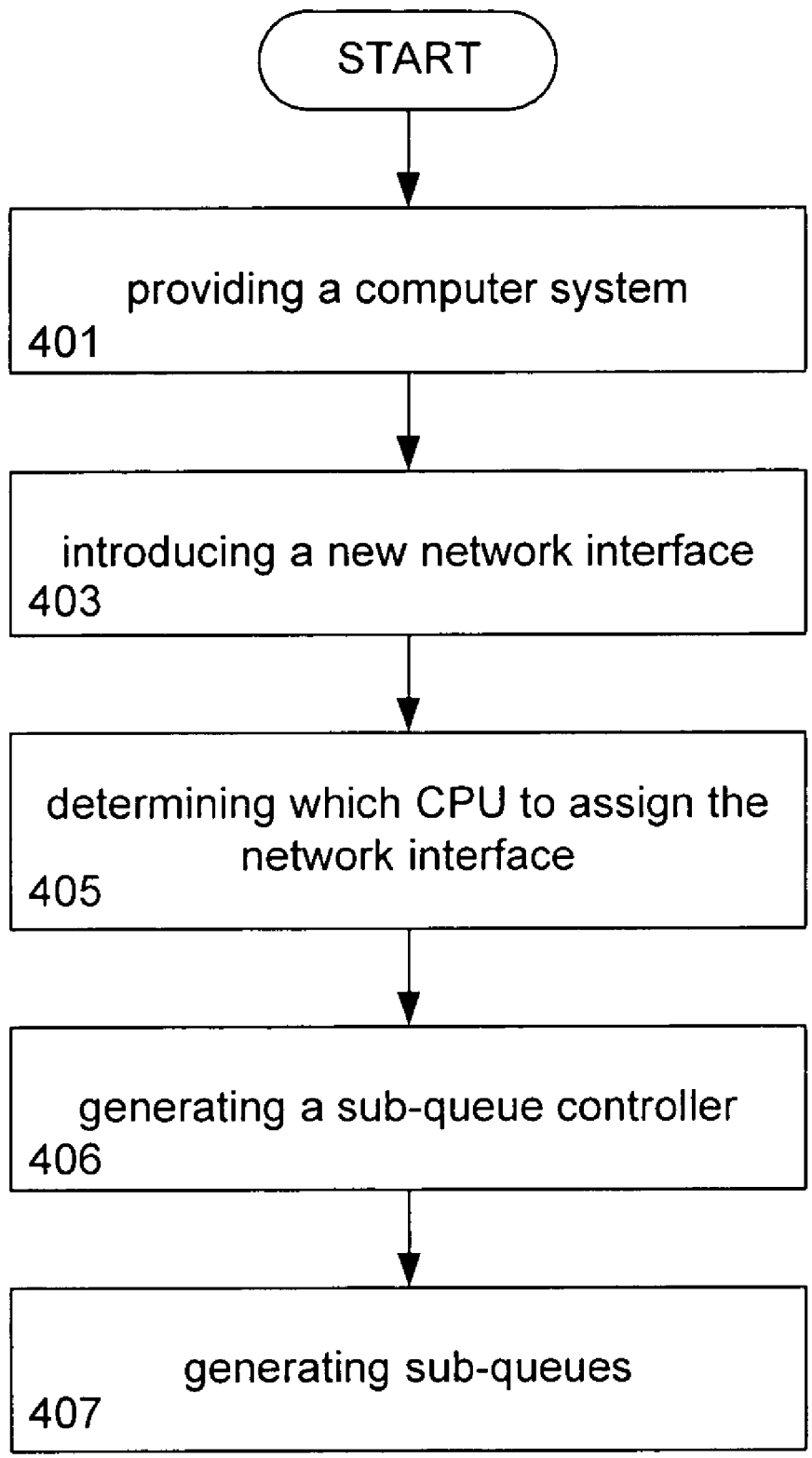
FIG. 4A is a flow diagram of a process embodiment for setting-up a network interface for use in a computer system in accordance with the embodiments of the present invention.

FIG. 4A is a simplified flow diagram illustrating one embodiment of a method 400 of installing a network interface in a computer network architecture. The method begins by providing a suitable computer system architecture (Step 401). Such an architecture includes a computer system having at least one central processing unit and a plurality of network interfaces. Typically, this is a multi-CPU system, but the principles of the invention can be applied equally to single CPU systems. The system includes a number of network interfaces. Generally, the number of interfaces is at least as great as the number of CPU's. Each network interface is assigned to specific CPU using a queue. In the case where there are already more network interfaces than CPU's some interfaces may be assigned to CPU's by means of existing virtual queues (sub-queues). A new network interface is introduced to the computer system (Step 403). Typically, but not exclusively the network interface is a network interface card (NIC). The interface can simply be plugged into the system.

The method then determines which CPU that the new network interface shall be assigned (Step 405). As a result the CPU thereby defining an overloaded CPU (a CPU that has been assigned more than one network interface). The process of determining which CPU is assigned is explained in greater detail below with respect to FIG. 4B.

A sub-queue controller is generated for coordinating the operation of the sub-queues of the overloaded CPU (Step 406). This includes the generation of a sub-queue generation engine (e.g., engine 332) that can be used to set-up sub-queues associated with the newly installed network interface. The controller can also generate indicators that identifies memory locations for the sub-queue set up engine and allow the controller ready access to the sub-queue set-up engine 332. Additionally, an allocation engine (e.g., 334) can be generated for the controller. Additionally, the controller can include generate allocation indicators that identifies memory locations for the allocation engine thereby allowing the controller to readily access and use the allocation engine. Additionally, the controller can be configured to access various schedulers (e.g., using indicators). Also, data structures can be set up to control the rate at which data is transferred from the newly added network interface and the associated sub-queues. Also, indicators that identify memory locations for the logic and processing needed to control data transfer from the network interface to the sub-queues can be generated.

A plurality of sub-queues are generated (Step 407). The number of sub-queues should accommodate the number of network interfaces assigned to the overloaded CPU. In general, the existing queue remains. The existing queue preferably remains associated with the same network interface that it was associated with prior to the introduction of the new interface. All of its data and data structures remain the same, it merely becomes re-designated as a sub-queue. Additionally, a new sub-queue is generated and associated with the new network interface. Commonly, the sub-queue comprises a serial queue that can be implemented as a ring buffer. As is known to those having ordinary skill in the art other types of queues can be implemented as the sub-queue. Memory is allocated for the sub-queues and indicators are generated that reference the memory locations for the sub-queues. The sub-queue(s) are then assigning to the corresponding network interface(s) and to the overloaded CPU (Step 409). This data can be stored in the associated sub-queue controller. Once these structures are generated and the processes complete the network interfaces can begin transmitting data.

Figure 4B:
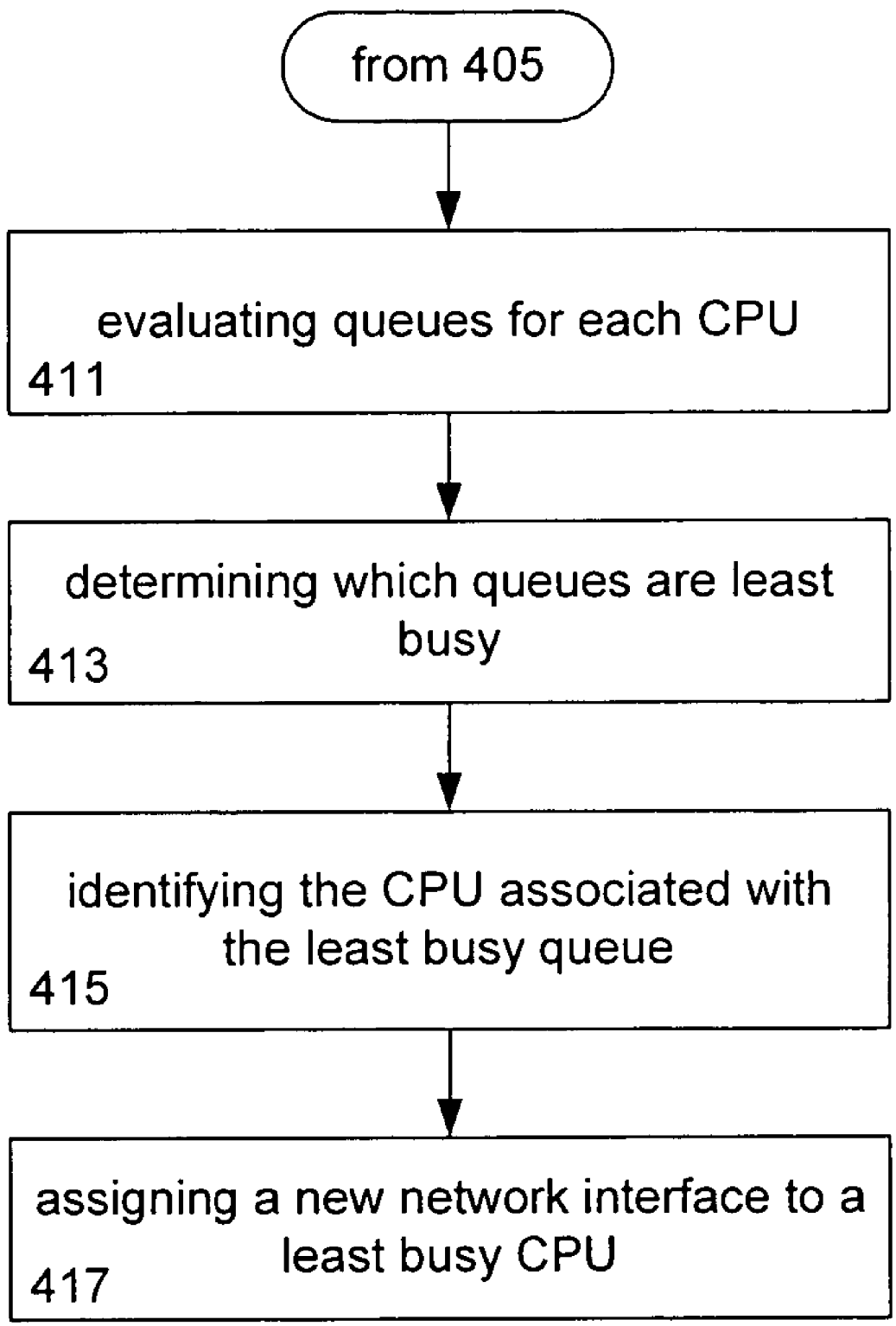
FIG. 4B is a flow diagram illustrating a process embodiment for determining which CPU a network interface is to be assigned in accordance with the embodiments of the present invention.

Referring now to FIG. 4B, a flow diagram illustrating a process of determining which CPU that the new network interface shall be assigned is disclosed. Each queue in the computer system is evaluated (Step 411). In one embodiment, this involves checking each queue to see how full of untransmitted data the queues are. This information is compared and a determination is made as to which queue is the least full (i.e., the least busy)(Step 413). In the case where one queue is less busy than the rest, this queue is defined as the least busy. Where more than one queue has the same level of activity (e.g., two or more queues are empty), a second level of evaluation can be performed. Each of the queues at the same level of activity has its activity history checked. For example, the activity history for the queues is checked over some time period (e.g., the last 5 seconds) and a comparison of activity levels is made. The queue having the least active activity history for the indicated time period is chosen as the least busy. As can be appreciated by those of ordinary skill in the art other methods and criteria for determining a least busy queue can be used. In any case, once a least busy queue has been determined a determination is made as to which CPU is associated with the least busy queue (Step 415). This CPU is then designated as the available CPU and the new network interface card is assigned to this CPU (Step 417).

Figure 5A:
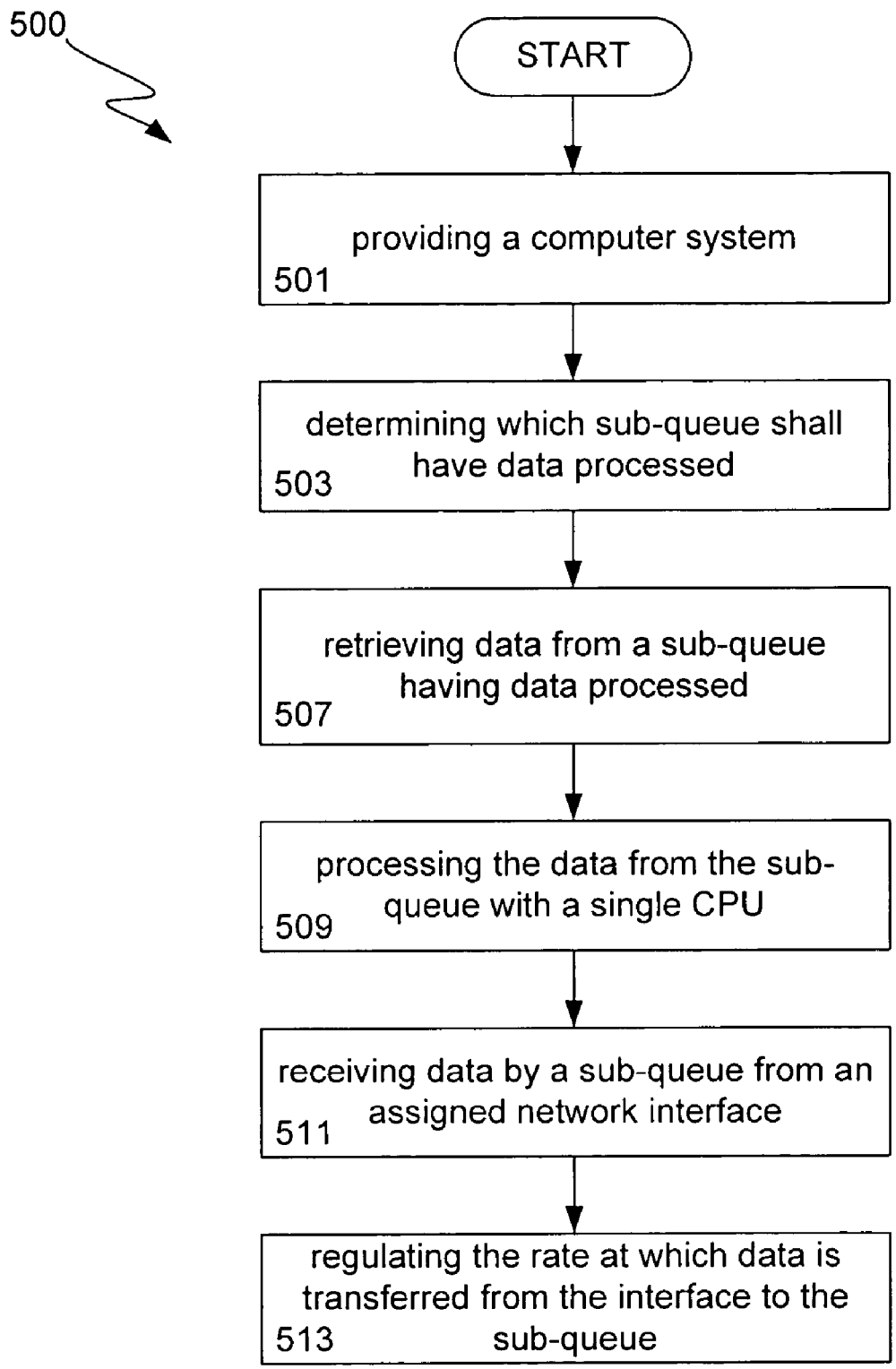
FIG. 5A is a flow diagram illustrating a process embodiment for servicing message packets in a computer system in accordance with the embodiments of the present invention.

FIG. 5A depicts a simplified flow diagram illustrating one embodiment of a method 500 of servicing data (e.g., message packets) in a computer system architecture constructed in accordance with the principles of the invention. Example embodiments of such architectures have already been described herein. The method begins by operating in a suitably constructed network environment or computer system architecture (Step 501). In one example, such an architecture includes a computer system having at least one central processing unit and a plurality of network interfaces. As previously explained, this is typically a multi-CPU system, although not limited to such. The system is configured to include a number of network interfaces. The number of network interfaces is greater than the number of CPU's and system includes at least one overloaded CPU having more than one network interface assigned to it. Each overloaded CPU is associated therewith a sub-queue controller and associated sub-queues for each network interface assigned to said overloaded CPU. One example of such a system embodiment is illustrated in FIG. 2. The inventors note that the invention can be practiced using other system embodiments. Each of the sub-queues is capable of receiving and storing message packets received from the network interface assigned to the sub-queue.

For each CPU (e.g., CPU 201 of FIG. 2) having multiple network interfaces, a determination is made as to which network interface shall be processed as any given time (Step 503). In other words, for each overloaded CPU (e.g. CPU 201) one of the sub-queues associated with a network interface assigned to the CPU is selected for message processing. Many selection criteria can be used and can be set by a system user or administrator. Additionally, these criteria and parameters can be changed dynamically while the system is in use if desired.

In one example embodiment, a determination of which of the sub-queues is to be selected for message processing can be made using a time based priority system. For example, in such a time based priority system the processing time allocated to each sub-queue is allocated on a per unit time basis. This process was briefly discussed hereinabove. For example, the data of sub-queue 1 can be processed for four seconds, then the data of sub-queue 2 is processed for two seconds, and back to sub-queue 1 for four seconds, and so on. Equal or unequal time allotments can be used. Additionally, these time allotments can be adjusted dynamically during use to reflect the needs of the system. Also, the time allotments can take into consideration the processing and message transfer capacities of heterogeneous network interfaces. Typically, the allocation of processing time devoted to each sub-queue is managed by a controller (e.g., 225) in the operating system. As previously explained, in one embodiment the controller can include an allocation engine configured to allocate which sub-queues have their contents processed at any given time. Such allocation is generally implemented using a scheduler (i.e., scheduling hardware or software that implements scheduling algorithms). As alluded to above, time devoted to each sub queue can be allotted in accordance with system criteria or user preference.

In another example embodiment, a determination of which of the sub-queues is to be selected for message processing can be made using a packet based priority system. For example, in such a packet based priority system the processing time allocated to each sub-queue is allocated on a per packet basis. This process was briefly discussed hereinabove. For example, the ten packets of sub-queue 1 can be processed, then ten packets of sub-queue 2 can be, and back to sub-queue 1 for ten more packets, and so on. Equal or unequal packet allotments can be used. Additionally, these packet allotments can be adjusted dynamically during use to reflect the needs of the system. Also, the time allotments can take into consideration the processing and message transfer capacities of heterogeneous network interfaces. As above, the allocation of processing time devoted to each sub-queue can be managed by the operating system (e.g., controller 225). As previously explained, in one embodiment the controller can include an allocation engine configured to allocate which sub-queues have their contents processed at any given time. Such allocation is generally implemented using a scheduler (i.e., scheduling hardware or software that implements scheduling algorithms). As alluded to above, the number of packets to be processed by each sub queue can be allotted in accordance with system criteria or user preference.

Additionally, many other types of priority systems can be implemented. In a further embodiment, which of the sub-queues shall be selected for message processing includes selecting from among the sub-queues using a priority system based on the relative data transfer capacities of the network interfaces assigned to said overloaded CPU. For example, a high capacity network interface could be serviced more or less frequently (by time or by packet) than a lower capacity network interface assigned to the same CPU. Also, the backlogs in each sub-queue could be used to dynamically adjust the rates at which data is processed for each sub-queue. Moreover, the inventors contemplate that selecting from among the sub-queues for message processing can be accomplished using a priority system that can be adjusted at will by a user.

Once a sub-queue is selected message packet(s) are retrieved from the selected sub-queue in accordance with the selected priority schedule (Step 507). Each message packet is then processed by the CPU (step 509). Importantly, for each message packet the same CPU conducts all the processing (e.g., TCP processing, IP processing, socket processing, and so on). Processing in this manner can result in performance increases on the order of about 30-50% for computers computer systems constructed in accordance with the principles of the invention.

Further, the sub-queues receive data from the network interface to refill the sub-queues (Step 511). Additionally, further system efficiencies can be achieved by controlling the data flow rate between the network interface and its associated sub-queue (Step 513).

Figure 5B:
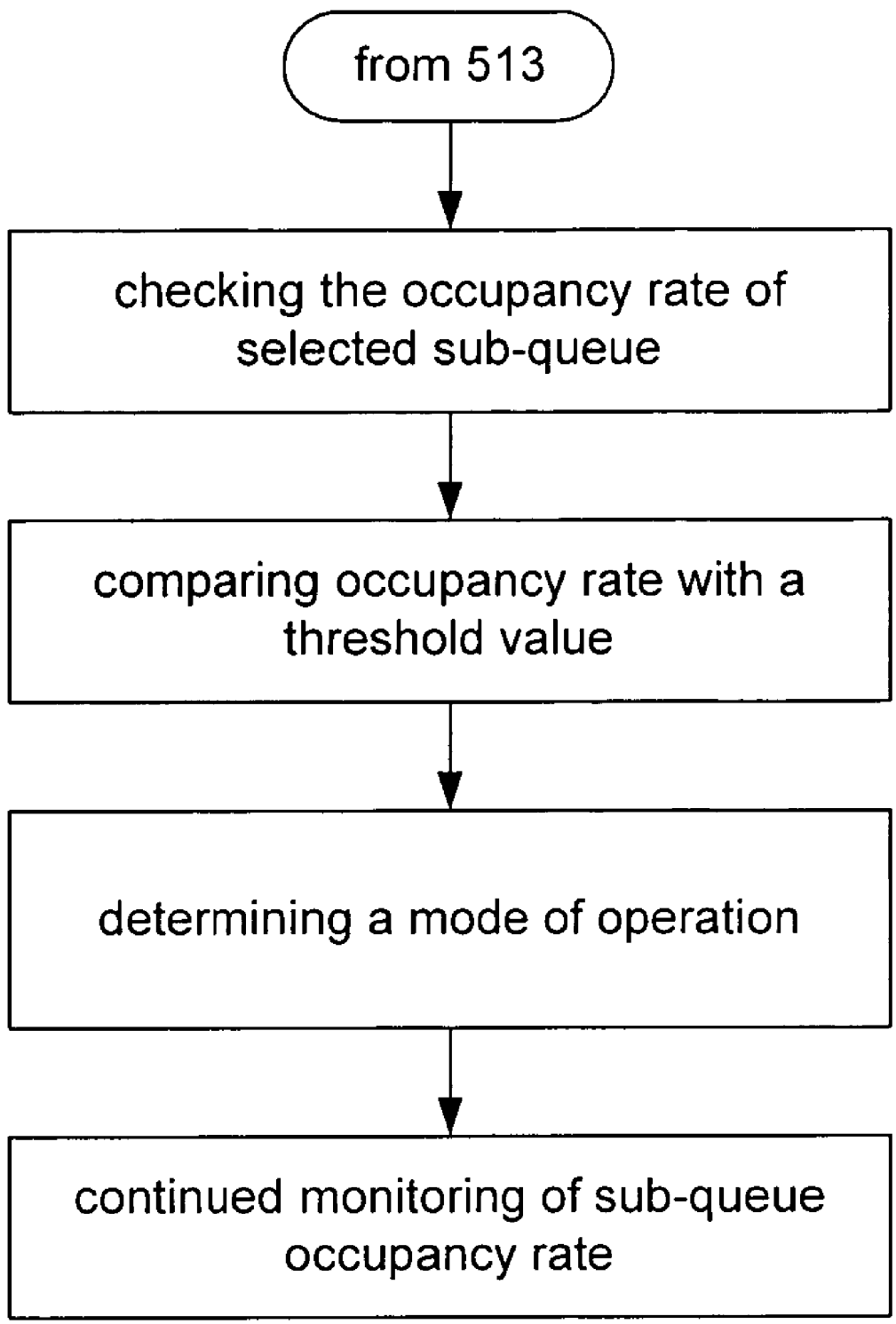
FIG. 5B is a flow diagram illustrating a process embodiment for regulating the data flow from a network interface to the sub-queues of a computer system in accordance with the embodiments of the present invention.

One embodiment suitable for controlling the data flow rate between the network interface and its associated sub-queue is illustrated in the simplified flow diagram of FIG. 5B. Typically, the operating system (e.g., using engine 336) checks the sub-queue under evaluation to determine the occupancy rate of the sub-queue (Step 521). As explained above, occupancy rate is a measure of the amount of data in each sub-queue (i.e., how full the sub-queue). This occupancy rate value is then compared, for example, with a threshold value (e.g., an occupancy threshold value) (Step 523). This threshold value can be determined or set by a user, for example, using factors such as amount of data in the sub-queue, amount of space remaining for data in the sub-queue, current data transfer rate, average or peak data transfer rates from the network interface, and so on. The comparison is periodically performed to determine if a change in mode of operation is needed (Step 525). For example, if the threshold is exceeded (too much data being received) the affected sub-queue can switch from an interrupt mode of operation to a polling mode (or if already in polling mode it can stay in polling mode). Alternatively, if the occupancy rate of the sub-queue is below some threshold value (which can be different from or the same as the other threshold value depending on the desires of the user), the affected sub-queue is relatively empty. Accordingly, the sub-queue can accept a greater data flow rate. Therefore, the sub-queue can switch from a polling mode of operation to an interrupt mode (or if already in interrupt mode it can remain so). As alluded to previously, the sub-queues are periodically (or in some embodiments) continuously monitored to determine the occupancy rate and thereby regulate the data flow rate from the network interface (Step 527). Such monitoring enables the system to evaluate the sub-queues and make periodic adjustments to the data transfer rate. Such monitoring and adjustment can be dynamically made. They can be made automatically or manually based on a wide range of criteria and factors known to those having ordinary skill in the art.

Figure 6A:
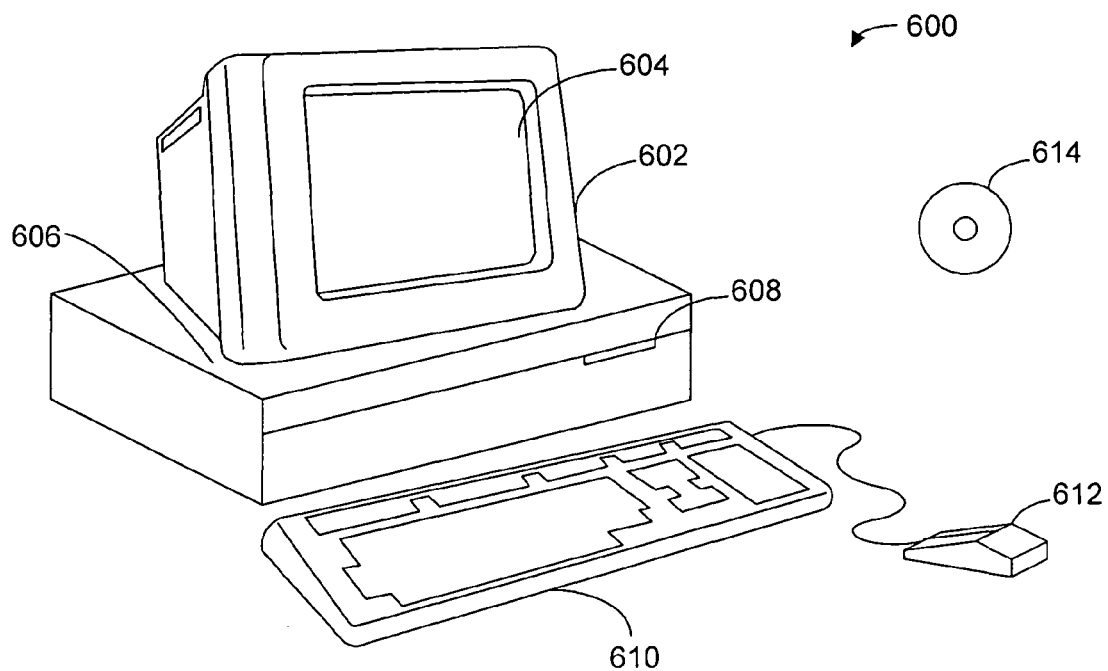
FIGS. 6A and 6B illustrate an example of a computer system that may be used in accordance with the invention.
Figure 6B:
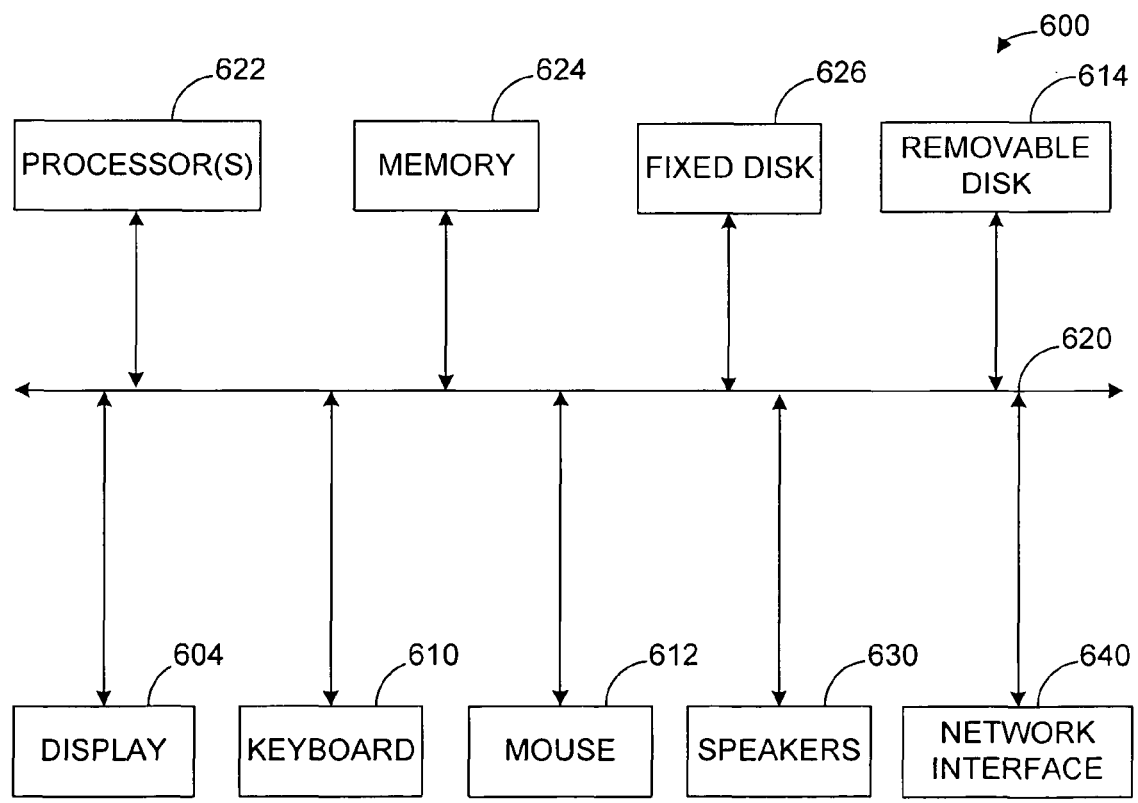

FIGS. 6A and 6B illustrate an example of a computer system 600 that may be used in accordance with the invention. FIG. 6A shows a computer system 600 that includes a display 602, screen 604, cabinet 606, keyboard 610, and mouse 612. Mouse 612 may have one or more buttons for interacting with a graphical user interface. Cabinet 606 can house a CD-ROM drive 608, system memory and a hard drive (see FIG. 6B) which may be utilized to store and retrieve software programs incorporating computer code that implements the invention, data for use with the invention, and the like. Although CD-ROM 608 is shown as an exemplary computer readable storage medium, other computer readable storage media including floppy disk, DVD, tape, memory sticks, flash memory, system memory, and hard drive may be utilized. In one implementation, an operating system for the computer system 600 is provided in the system memory, the hard drive, the CD-ROM 608 or other computer readable storage medium and serves to incorporate the computer code that implements the invention. It is to be remembered that the operating system can be configured so it controls all of the processors of the system. It should be noted that other devices (e.g., printers, scanners, etc.) may be present in the computer system 600.

FIG. 6B shows a system block diagram of computer system 600 used to execute the software of an embodiment of the invention. The computer system 600 includes monitor 604, keyboard 610, and mouse 612. Computer system 600 further includes subsystems, such as a plurality of central processors (CPU's) 622 (including cache memory resources), system memory 624, fixed storage 626 (e.g., hard drive), removable storage 614 (e.g., CD-ROM drive), display adapter, sound card and speakers 630, and network interface 640. The network interface can be used to facilitate connection with many different network structures including the Internet. The central processors 651, for example, can execute computer program code (e.g., an operating system) to implement the invention. An operating system is normally (but not necessarily) resident in the system memory 624 during its execution. Other computer systems suitable for use with the invention may include additional or fewer subsystems. Importantly, the principles of the invention can specifically be implemented on networked computer systems having many individual computers. Such networked systems can include local area networks (LAN's) or a wide area network (WAN's). Particularly, the inventors contemplate computer systems and message traffic operating over the Internet. Additionally, an example of a LAN is a private network used by a mid-sized company with a building complex. Publicly accessible WAN's include the Internet, cellular telephone network, satellite systems and plain-old-telephone systems (POTS). Examples of private WAN's include those used by multinational corporations for their internal information system needs. The network may also be a combination of private and/or public LANs and/or WANs.

The system bus architecture of computer system 600 is represented by arrows 620. However, these arrows are illustrative of any interconnection scheme serving to link the subsystems. For example, a local bus could be utilized to connect the central processor to the system memory and display adapter. Computer system 600 shown in FIG. 6B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of operations or instructions leading to a desired result. The operations can be those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing", "receiving," "creating," "connecting," "transferring," "sending," "updating," "entering", "computing" or the like, refer to the action and processes of a computer or computerized system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The many features of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described by the specification. Hence, all suitable modifications and equivalents may be resorted to as falling within the scope of the invention. In addition, embodiments of the present invention further relate to computer products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. It should also be noted that there are many alternative ways of implementing the methods, systems, computer instructions and apparatuses of the present invention.

It is therefore intended that the following appended claims be interpreted as including all such alterations, permutations, and equivalents as fall within the spirit and scope of the present invention.

What is claimed is:

1. A method of installing a network interface, the method comprising:

introducing a new network interface to a computer system architecture, wherein the computer architecture prior to introducing the new network interface comprises a plurality of central processing units (CPUs) and a plurality of existing network interfaces, wherein the number of existing network interfaces is at least as great as the number of CPUs, wherein each existing network interface is assigned to a designated CPU of the plurality of CPUs using a designated queue of a plurality of queues, and wherein at least one existing network interface is assigned to each CPU of the plurality of CPUs;

selecting a first queue of the plurality of queues based on the first queue comprising a least amount of data amongst the plurality of queues;

identifying, from the plurality of CPUs, a CPU corresponding to the first queue based on the first queue comprising the least amount of data;

assigning the new network interface to the CPU to generate an overloaded CPU, wherein after assigning the new network interface, the overloaded CPU comprises more than one network interface assigned to the overloaded CPU;

generating, by one of the plurality of CPUs, a plurality of sub-queues sufficient to accommodate the more than one network interface assigned to the overloaded CPU, wherein each network interface of the overloaded CPU is associated with a separate sub-queue of the plurality of sub-queues;

assigning the plurality of sub-queues to the overloaded CPU; and generating a sub-queue controller for coordinating the operation of the sub-queues of the overloaded CPU.

2. The method of claim 1, wherein said introducing the new network interface to the computer system architecture comprises plugging a network interface card into the computer system architecture.

3. The method of claim 1, further comprising:
identifying the first queue and a second queue of the plurality of queues based on each comprising the least amount of data amongst the plurality of queues;
analyzing a message packet processing history for the first queue and the second queue to identify the first queue as less busy than the second queue,
wherein selecting the first queue is based on the first queue comprising the least amount of data amongst the plurality of queues and being less busy than the second queue.

4. The method of claim 1, wherein generating the plurality of sub-queues for the overloaded CPU comprises:
generating a new sub-queue for servicing the new network interface and converting an existing queue that previously serviced an existing network interface to a sub-queue to continue servicing the existing network interface.

5. The method of claim 1, wherein the sub-queue controller includes:
providing an indicator for each sub-queue, wherein each indicator identifies a memory location for each sub-queue assigned to each of the network interfaces associated with the overloaded CPU; and
providing an indicator for an allocation engine, wherein the indicator identifies a memory location for the allocation engine which regulates the flow of message packets from the sub-queues to the overloaded CPU to facilitate message traffic between the network interfaces and the overloaded CPU.

6. A non-transitory computer readable media comprising computer program code for installing a network interface in a computer system architecture, computer readable media comprising:
computer program code for introducing a new network interface to the computer system architecture,
wherein the computer architecture prior to introducing the new network interface comprises a plurality of central processing units (CPUs) and a plurality of existing network interfaces,
wherein the number of existing network interfaces is at least as great as the number of CPUs,
wherein each existing network interface is assigned to a designated CPU of the plurality of CPUs using a designated queue of a plurality of queues, and
wherein at least one existing network interface is assigned to each CPU of the plurality of CPUs;
computer program code for selecting a first queue of the plurality of queues based on the first queue comprising a least amount of data amongst the plurality of queues;
computer program code for identifying, from the plurality of CPUs, a CPU corresponding to the first queue based on the first queue comprising the least amount of data;
computer program code for assigning the new network interface to the CPU to generate an overloaded CPU, wherein after assigning the new network interface, the overloaded CPU comprises more than one network interface assigned to the overloaded CPU;
computer program code for generating a plurality of sub-queues sufficient to accommodate the more than one network interfaces assigned to the overloaded CPU, wherein each network interface of the overloaded CPU is associated with a separate sub-queue of the plurality of sub-queues;
computer program code for assigning the plurality of sub-queues to the overloaded CPU; and
computer program code for generating a sub-queue controller for coordinating the operation of the sub-queues of the overloaded CPU.

7. The non-transitory computer readable media of claim 6, further comprising:
computer program code for identifying the first queue and a second queue of the plurality of queues based on each comprising the least amount of data amongst the plurality of queues;
computer program code for analyzing a message packet processing history for the first queue and the second queue to identify the first queue as less busy than the second queue,
wherein selecting the first queue is based on the first queue comprising the least amount of data amongst the plurality of queues and being less busy than the second queue.

8. The non-transitory computer readable media of claim 6, wherein the computer program code for generating the plurality of sub-queues for the overloaded CPU comprises:
computer program code for generating a new sub-queue for servicing the new network interface and converting an existing queue that previously serviced an existing network interface to a sub-queue to continue servicing the existing network interface.

9. The non-transitory computer readable media of claim 1, wherein the sub-queue controller includes:
computer program code for providing an indicator for each sub-queue, wherein each indicator identifies a memory location for each sub-queue assigned to each of the network interfaces associated with the overloaded CPU; and
computer program code for providing an indicator for an allocation engine, wherein the indicator identifies a memory location for the allocation engine which regulates the flow of message packets from the sub-queues to the overloaded CPU to facilitate message traffic between the network interfaces and the overloaded CPU.

10. A computer system comprising:
a plurality of CPUs;
a plurality of existing network interfaces,
wherein the number of existing network interfaces is at least as great as the number of CPUs,
wherein each existing network interface is assigned to a designated CPU of the plurality of CPUs using a designated queue of the plurality of queues, and
wherein at least one existing network interface is assigned to each CPU of the plurality of CPUs;
an operating system comprising:
a controller configured to:
detect a new network interface to the computer system;
select a first queue of the plurality of queues based on the first queue comprising a least amount of data amongst the plurality of queues;
identify, from the plurality of CPUs, a CPU corresponding to the first queue based on the first queue comprising the least amount of data; and
assign the new network interface to the CPU to generate an overloaded CPU, wherein after assigning the new network interface, the overloaded CPU comprises more than one network interface assigned to the overloaded CPU; and
a plurality of sub-queues, wherein each sub-queue is associated with one of the network interfaces that are assigned to the overloaded CPU, wherein each of the network interfaces that are assigned to the overloaded CPU is associated with a separate sub-queue of the plurality of sub-queues.

11. The computer system of claim 10, wherein the plurality of existing network interfaces are network interface cards (NIC).

12. The computer system of claim 10, wherein the controller allocates when message packets in each sub-queue are processed by the overloaded CPU.

13. The computer system of claim 12, wherein the controller determines a priority schedule for allocating when message packets in each sub-queue are processed by the overloaded CPU.

14. The computer system of claim 13, wherein the priority schedule for allocating when the message packets in each sub-queue are to be processed by the overloaded CPU comprises a time-based allocation.

15. The computer system of claim 13, wherein the priority schedule for allocating when the message packets in each sub-queue are to be processed by the overloaded CPU comprises a packet-based allocation dependent on the number of message packets processed for each sub-queue.

16. The computer system of claim 13, wherein the priority schedule for allocating when the message packets in each sub-queue are to be processed by the overloaded CPU is based upon the relative message processing capacities of the network interfaces associated with each sub-queue.

17. The computer system of claim 13, wherein the priority schedule for allocating when the message packets in each sub-queue are to be processed by the overloaded CPU can be adjusted by a user.

18. The computer system of claim 12, wherein the determining of the priority schedule for allocating when message packets in each sub-queue are processed by the overloaded CPU is determined by a scheduler.

19. The computer system of claim 12, wherein the controller is configured to control the rate at which data is received by a sub-queue by using the occupancy rate of each sub-queue.

20. The computer system of claim 19, wherein the controller controls the rate at which message packets are received by each sub-queue by alternatively using polling and interrupt techniques to facilitate the transmission of message packets from the assigned network interface.

21. The computer system of claim 10, wherein the controller enables dynamic installation of the new network interface and dynamic setup of new sub-queues to be assigned to the new network interface while the computer system remains in operation.

22. The computer system of claim 21, wherein the controller comprises a sub-queue setup engine configured to: perform the dynamic setup of the new sub-queues when the new network interface is added to the computer system.

23. The computer system of claim 10, wherein the controller is configured to control the rate at which data is received by a sub-queue from the network interface associated with the sub-queue.

24. The computer system of claim 23, wherein the controller is configured to control the rate at which data is received by a sub-queue by using the occupancy rate of each sub-queue.

25. The computer system of claim 24, wherein the controller controls the rate at which message packets are received by each sub-queue by alternatively using polling and interrupt techniques to facilitate the transmission of message packets from the assigned network interface.

* * * * *